United States Patent
Davis et al.

[11] Patent Number: 5,971,464
[45] Date of Patent: Oct. 26, 1999

[54] PICK-UP TRUCK TAILGATE LINER AND SEAT BACK

[76] Inventors: John Duane Davis, 151 Lone Tree Rd., Milford, Mich. 48380; Daniel Duane Davis, 12258 N. Fairbanks Rd., Linden, Mich. 48451; Lawrence Duane Davis, 420 E.120th St., Grant, Mich. 49327

[21] Appl. No.: 08/996,462

[22] Filed: Dec. 22, 1997

[51] Int. Cl.$^6$ .................................. B60N 2/22; B60N 2/36
[52] U.S. Cl. .................. 296/57.1; 296/65.01; 296/66
[58] Field of Search .................... 296/57.1, 64, 65.01, 296/66

[56] References Cited

U.S. PATENT DOCUMENTS

| | | | |
|---|---|---|---|
| 4,611,852 | 9/1986 | Filer | 297/352 |
| 4,911,493 | 3/1990 | Muirhead | 296/39.2 |
| 5,000,504 | 3/1991 | Munguia | 296/65.1 |
| 5,169,201 | 12/1992 | Gower | 296/39.2 |
| 5,215,346 | 6/1993 | Reitzloff et al. | 296/51 |
| 5,320,397 | 6/1994 | Peterson et al. | 296/57.1 |
| 5,372,397 | 12/1994 | Arndt | 296/39.2 |
| 5,462,334 | 10/1995 | Sedorcek et al. | 297/252 |
| 5,533,774 | 7/1996 | Cavanaugh | 296/66 |
| 5,868,449 | 2/1999 | Hitchcock | 296/57.1 |

*Primary Examiner*—D. Glenn Dayoan
*Assistant Examiner*—Paul Chenevert
*Attorney, Agent, or Firm*—Carrier, Blackman & Associates, P.C.; Joseph P. Carrier; William D. Blackman

[57] ABSTRACT

This invention relates to a pivotable protective pick-up truck tailgate liner assembly which when opened forms a tailgate seat-back rest. When closed it serves as a protective tailgate liner. Means are provided to utilize the tailgate in the horizontal position as a seat, and the tailgate liner invention as the seat back rest. Additionally, means are provided to utilize the existing vehicle body side tailgate latch brackets to lock said liner assembly into a seat back position. This invention is comprised of a rigid plastic base panel and a larger liner panel which are pivotally attached to each other. The base panel is securely attached to the tailgate surface, while snap fit connectors selectively attach and detach said larger liner panel to the tailgate. A sliding striker mechanism provides a means to fix said larger liner panel into the existing vehicle body side tailgate latch brackets to form a tailgate seat back-rest. To use the device as a seat back-rest, one simply opens the tailgate to its horizontal position, releases the liner snap fit attachments, extends the strikers, rotates the larger liner panel open, and inserts said strikers into the existing vehicle tailgate latch brackets.

8 Claims, 4 Drawing Sheets

SECTION A-A

PICK-UP TRUCK TAILGATE LINER AND SEAT BACK

BACKGROUND OF THE INVENTION

1. Field of the Invention

This invention relates, in general, to seating devices and in particular to pick-up truck liners and seating attachments.

2. Description of Related Art

It is seen that many pick-up truck owners purchase some type of protective liner to guard the cargo box and tailgate finish from heavy payload such as wood, cinder blocks, or similar material which will tend to scratch its surface. After loading and unloading such cargo it is seen, on many occasions, that people search for a comfortable and convenient place to sit while resting. Often a pick-up truck tailgate in the horizontal position is used as a makeshift seat. This is also noted at other outdoor events such as watching soccer at the local park, while fishing along a riverbank, or at the construction site during break. Without a backrest, however, this type of seat is uncomfortable and creates back strain. Such a backrest should not, however, interfere with the capacity or usefulness of the pick-up box or the exterior appearance of the vehicle. It is evident that there is a need for a simple, compact, convenient, and inexpensive liner which will provide a back-rest support for a pick-up truck tailgate. It must still protect the finish, be convenient to use, inexpensive to manufacture, and durable enough to withstand field use. This invention provides the means to fulfill these needs.

Reference is made to a number of prior art designs that have been developed to provide various means for an exterior vehicle seat and backrest. However, no prior art is known to exist which, in a practical manner, does not destroy the main utility of the pick-up truck vehicle. That is, to maintain full pick-up box cargo volume and to not impede cargo loading and unloading convenience. Previous liner and seating structures heretofore designed are complex, require attaching and detaching devices, storage, are expensive to manufacture, bulky, and greatly reduce pick-up box cargo volume and or impede cargo loading and unloading.

U.S. Pat. No. 5,533,774 to James C. Cananaugh discloses a "Vehicle Exterior Body Panel Seat".

U.S. Pat. Nos. 5,462,334, 5,215,346, 5,000,504, and 4,911,493, each provide some form of exterior vehicle seat and back-rest support.

U.S. Pat. No. 4,611,852 to Paul G. Filer discloses a "Bleacher Back-Rest". This portable design primarily consists of two main moldable plastic panels which fold open, interlock, and clamp to a bleacher to form a comfortable seat.

Whatever merits of the above cited designs, none of them fulfill the main objects of the present invention. Previous designs all sacrifice the main utility of the pick-up vehicle. Payload volume is greatly reduced as well as easy access for loading and unloading of the cargo box. The aforementioned designs also require storage when not in use. It is therefore shown that there is a need for a convenient, integral liner and seat back-rest design that utilizes the existing tailgate and latching brackets, does not reduce payload volume, does not impede cargo loading or unloading convenience, and also protects the tailgate finish. In these respects it is seen that this invention substantially departs from prior art designs, and in doing so fulfills the aforementioned needs.

SUMMARY OF THE INVENTION

It is a principal object of the present invention to provide a simple, inexpensive, and permanent tailgate seat-back support that does not reduce pick-up truck cargo box volume or usefulness.

It is a principal object of the present invention to provide a protective liner to protect the tailgate finish.

Another principal object of the present invention is to not degrade pick-up truck cargo box payload loading and unloading convenience.

Another principal object of the present invention is to not alter the exterior of the vehicle or require modification of existing parts.

Another object of the invention is to provide such a means with less moving parts, in a convenient, compact and in an easily manufacturable manner.

The foregoing objects are accomplished by this invention which is comprised of a moldable plastic liner assembly that attaches to the tailgate's surface forming a pivotable protective liner and selectively a back-rest support. In the preferred embodiment of the invention, hinges are integrally molded from the two liner panel sections, and couple the base section to a larger liner section. Hinges allow said larger liner panel section to rotate in the open and closed positions. The base section is attached to the tailgate with conventional sheet metal screws. A cable or strap connecting the middle of the liner to the tailgate provides additional back support stiffness. Snap fit attachments provide a means to selectively hold the main liner panel in the closed position to protect the tailgate finish. The liner panel also houses a sliding striker mechanism which is used to fix said larger liner panel into the existing vehicle side tailgate latch brackets in its open position when used as a tailgate seat back rest.

To use the liner invention as a back-rest one simply opens the tailgate to its horizontal position, releases the snap fit attachments, extends the strikers, and rotates the main liner panel up so that said strikers lock into the vehicle's existing tailgate latch brackets.

DESCRIPTION OF THE PREFERRED EMBODIMENT

Figure 1:
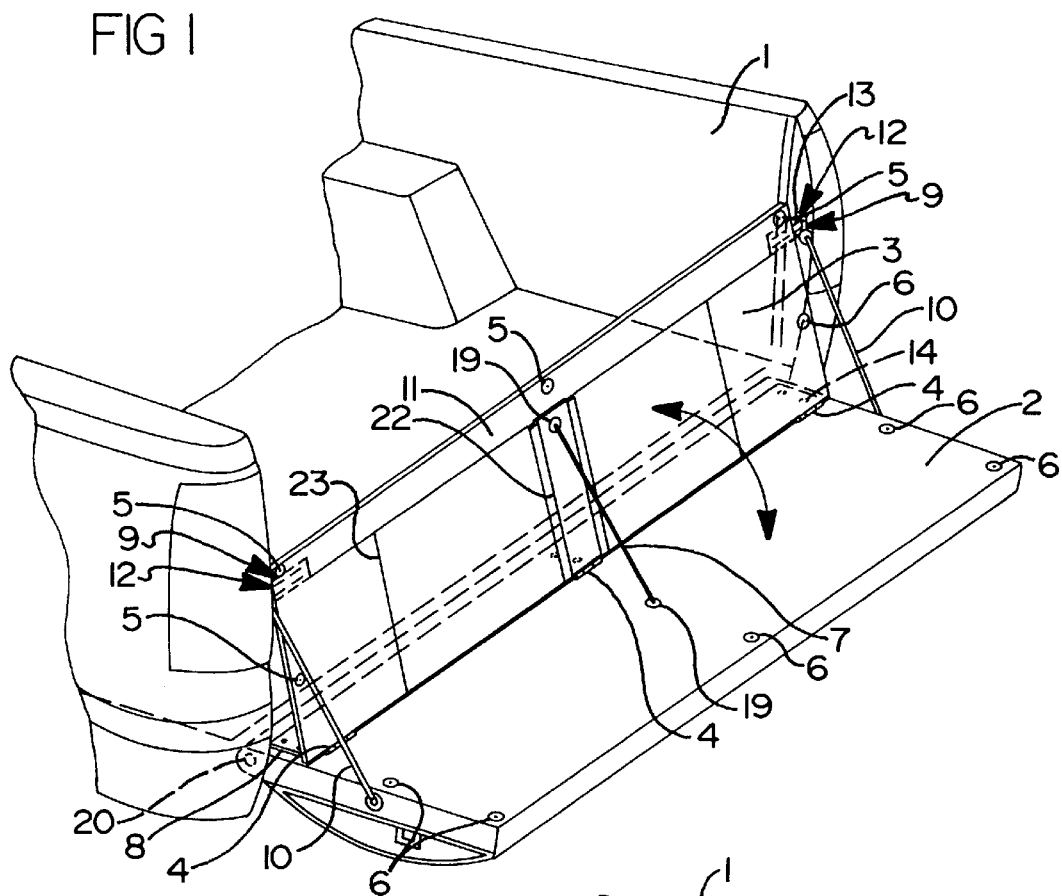
FIG. 1 is a perspective view of the present invention with the tailgate in the horizontal position and the device in the open position creating a tailgate seat back-rest support.

FIG. 1 is an overall perspective drawing of the preferred embodiment of the invention in its open position shown using the tailgate in its horizontal position as a seat 2 and the novel liner assembly as a seat back-rest, which is a large main rectangular liner panel 3. A partial view of a pick-up truck cargo box 1 also is shown. The typical pick-up truck tailgate is held in the open, horizontal, position with existing vehicle cable supports 10. A pivot 20 provides the means to rotate the tailgate to its vertical position where it fixes into existing vehicle body side tailgate latch brackets 13 when closed. Here, in FIG. 1, it is shown that a base liner panel 8 is securely attached to the tailgate 2 using conventional sheet metal screws 14 while, the larger, mainly rectangular, liner panel 3 is pivotably mounted to the base section using molded in hinges 4. Snap fit connectors 5 selectively hold said larger liner panel in closed position. A sliding striker 12 locks into the existing vehicle side latch brackets 13 when the tailgate is in its horizontal position and the larger panel is in the open position used as a tailgate seat backrest.

FIG. 1, also shows a cable strap support 7 which provides additional seat-back stiffness when in the open position. The cable strap 7 mounts to the liner panel 3 and tailgate 2 using a conventional ring and bolt fastener 19. A rectangular shaped embossed section 22 is molded in the main liner panel 3 to form a pocket just large enough to house the cable strap 7 when the liner is in the closed position. The embossed section 22 also provides additional panel stiffness. FIG. 1, also shows several lateral ribs 11 which are also molded along the aft edge of the tailgate liner panel 3 to provide increased lateral bending stiffness. Additionally, a plurality of longitudinal molded-in ribs 23 are provided to increase vertical bending stiffness of said main panel 3 when used as a seat back support. This invention is designed not to interfere with normal operation of the tailgate.

Figure 2:
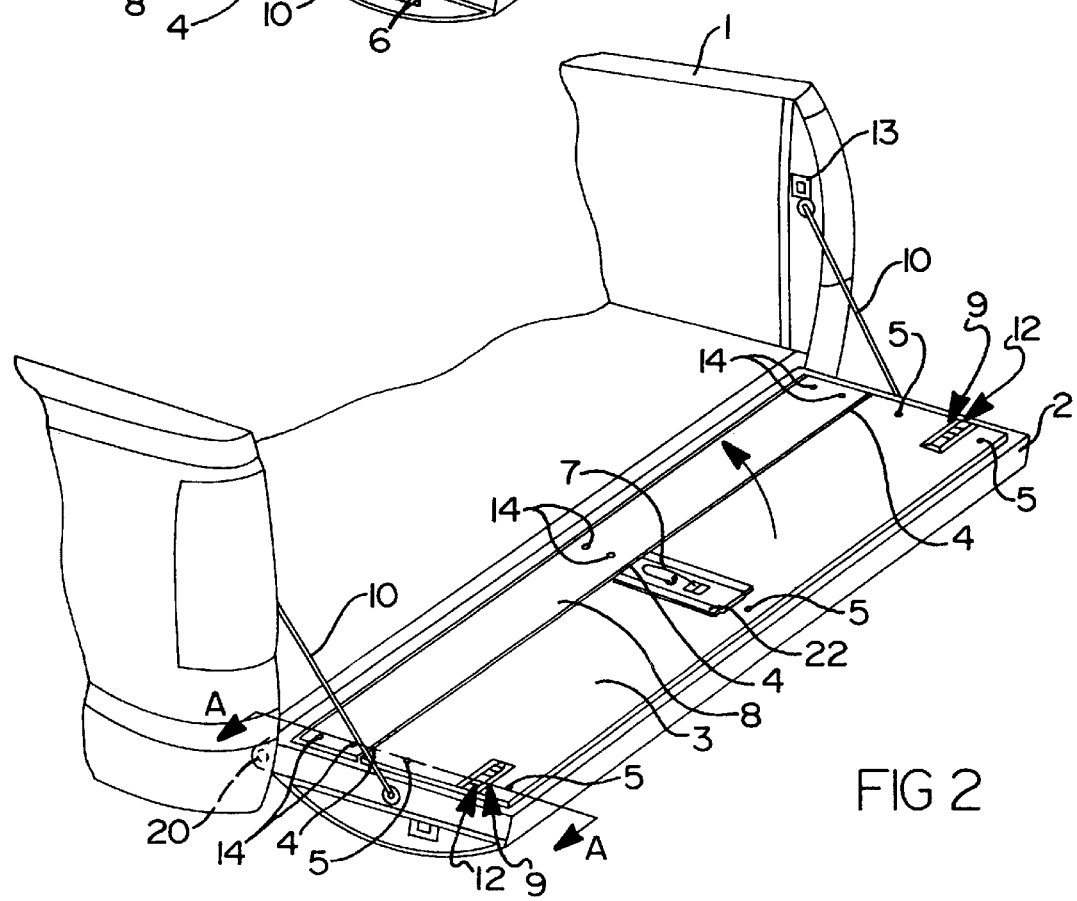
FIG. 2 is a perspective view of the device being use as a protective liner.

FIG. 2 shows the invention in the closed position being used as a tailgate liner. Here said tailgate liner base section 8 and said larger main panel 3 are shown selectively fixed parallel to the tailgate's 2 upper surface. Snap fit connectors 5 provide a means to selectively attach and detach said main liner panel 3. The pick-up cargo box 1 is also shown. Here in FIG. 2, and in FIG. 4, it is easily seen that the base and main panel sections are as thin as conventional ribbed liners and do not reduce pickup box volume or impede loading and unloading convenience.

A sliding striker 12 is sandwiched between the liner panel and a retaining bracket 9. Said retaining bracket is fastened to the liner panel 3 with conventional screws or rivets. Here in FIG. 2 the liner assembly is shown in the closed position with said embossed pocket 22 shown enclosing the cable support strap 7 drawn in phantom lines.

Figure 3:
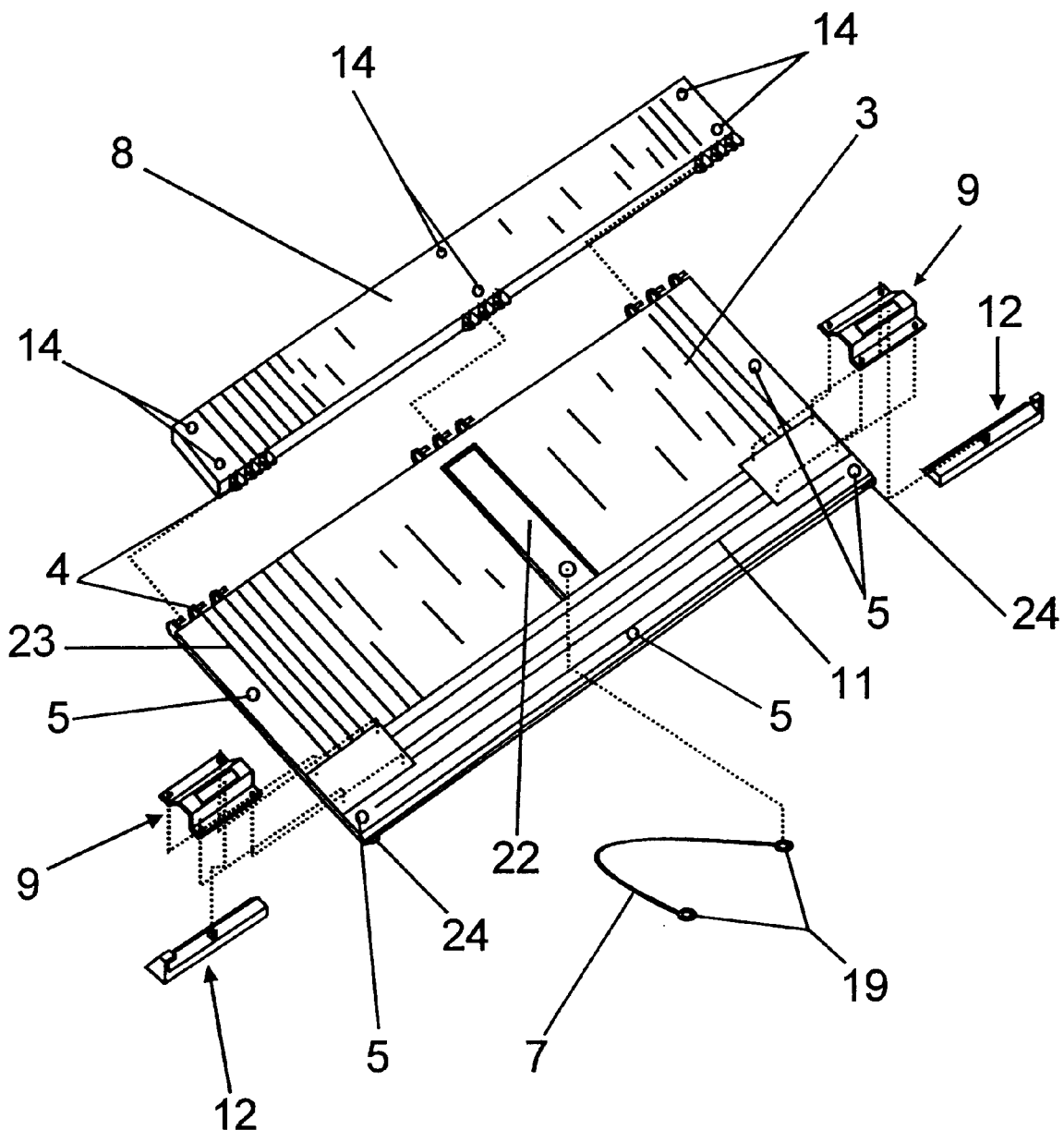
FIG. 3 is a fragmentary view of the preferred embodiment.

FIG. 3, is a fragmentary view of the tailgate liner assembly. This view shows how hinges 4 are formed between the base panel 8 and said larger main liner panel 3. The sliding striker 12 rests on the upper surface of the main liner panel 3 and is held in place with a housing bracket 9. This housing bracket 9 sandwiches the striker 12 onto the liner panel 3 snugly enough so that it does not rattle, and also loosely enough to easily slide it laterally back and forth. Said housing bracket is attached to the liner panel with conventional screws or rivets. As mentioned earlier, said base panel 8 is securely fastened to the tailgate 2 with conventional screws 14, while the main liner panel 3 is selectively fastened to the tailgate with snap fit connectors 5. Thumb tabs 24 are also provided to help pull open the snap fit connectors.

Figure 4:
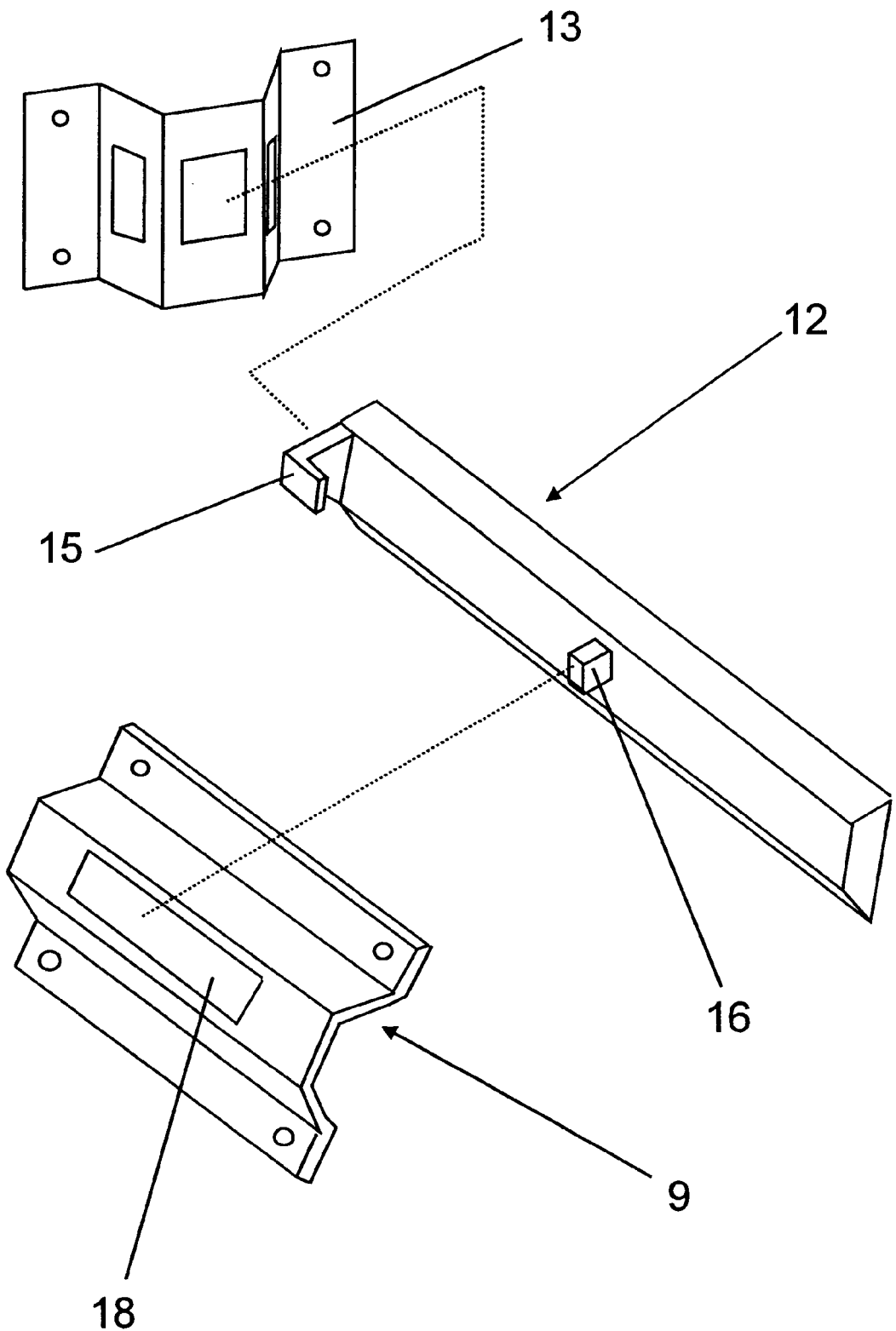
FIG. 4 is a detailed view with the striker, retaining bracket and a conventional vehicle body side tailgate latch bracket.
Figure 5:
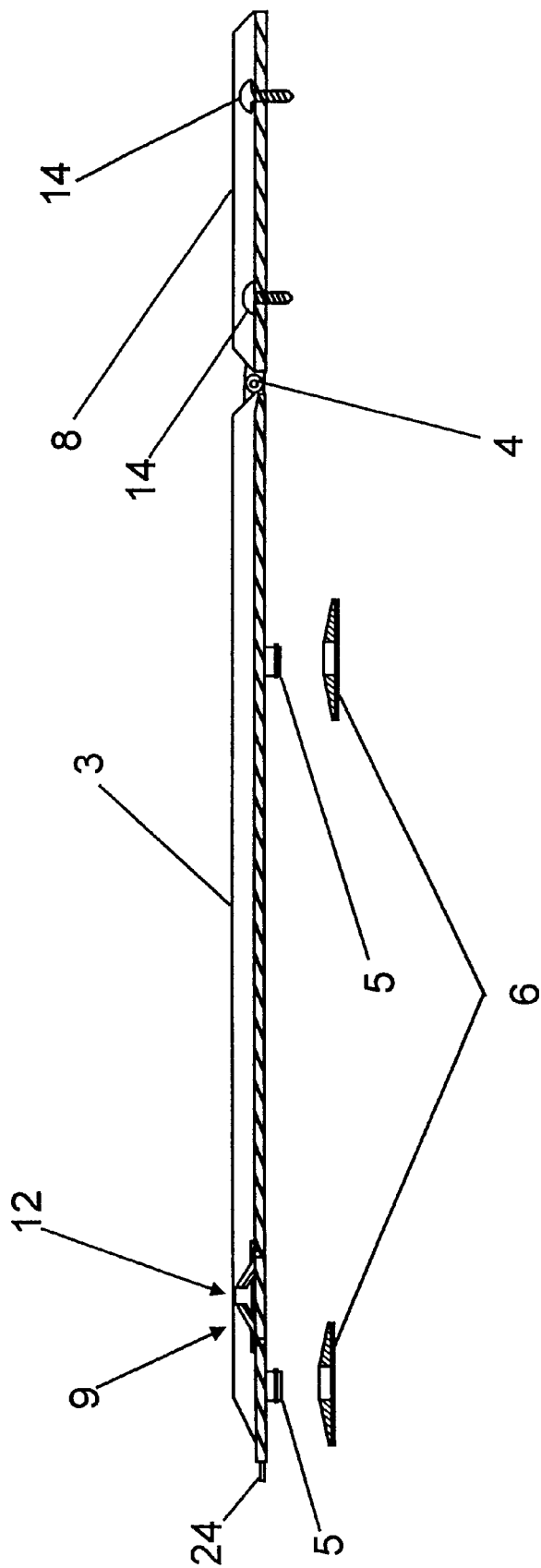
FIG. 5 is section view of line A-A in FIG. 2 of the preferred embodiment.

FIG. 4 shows a detailed view of the sliding striker 12, its housing bracket 9 and how said striker interlocks into a conventional pick-up truck tailgate body side latch bracket 13. The striker is comprised of a hook 15 which provides a means to interlock into conventional vehicle body side tailgate latch brackets 13. One simply inserts the striker hook 15 which is disposed on one end of the striker 12, into the body side tailgate bracket 13 to fix said larger liner panel into its open, mainly vertical, position. The retaining bracket 9 has a rectangular opening 18 in its upper surface to enclose an embossed tab 16 on the striker 12. This limits the striker's lateral motion. FIG. 5, shows section A—A from FIG. 2 in the closed position. In the preferred embodiment, the pin portion of the snap fit connector 5 is integrally molded to the main liner panel 3. A receiving button 6 is also shown which is a attached to the tailgate 2 using adhesive. Thumb tabs 24 provide a means to help pull open the snap fit connectors. Here it is best shown how the striker 12 and its retaining bracket 9 will not interfere with cargo loading and unloading since it is housed within the liner's support ribs. This section view also shows that this invention is made thin as a conventional liner so that the pick-up cargo box volume is not reduced nor is cargo loading and unloading convenience sacrificed.

To use the liner assembly as a back-rest one simply opens the tailgate to its horizontal position, releases the snap fit attachments, extends the strikers, and rotates the main liner up so that said strikers lock into the vehicle's existing tailgate latch brackets.

The foregoing description of the preferred embodiment of the invention is not intended to exhaustive or limit the invention to the precise form disclosed. Many modifications and variations are possible in the light of this teaching and are expected to arise therefrom. Such modifications shall be considered inclusive to this invention so long as it does not depart from the main spirit of the claims appended herein. It is also to be understood that certain terminology employed herein is for the purpose of description and should not be regarded as limiting.

We claim:

1. In a pick-up truck having a pivotable tailgate and existing body side tailgate latch brackets, a pivotable tailgate liner assembly comprising of: a base panel section which is permanently attached to said pick-up truck tailgate and also pivotably connected to a larger liner panel section; a striker mechanism mounted on the left and right sides of said larger panel section which provides a means to fix said larger liner panel in the open position into said existing body side tailgate latch brackets when said tailgate is in its horizontal position; a support of at least one of cable and strap connecting said larger liner panel to said tailgate; snap fit connectors which selectively attach said larger liner panel to said tailgate which when released allows said larger liner panel to rotate open.

2. The tailgate liner assembly of claim 1 wherein said tailgate liner panels further comprise of a moldable material.

3. The tailgate liner assembly of claim 2 wherein molded-in hinges are used to provide a means to pivot open and closed said larger main liner panel.

4. The tailgate liner assembly of claim 2 further comprising of a plurality of lateral ribs molded adjacent to the aft edge of said larger liner panel, and longitudinal ribs molded on the remaining surface thereon.

5. The tailgate liner assembly of claim 2 further comprising of said striker mechanism housed within said larger liner panel, wherein said striker mechanism is capable of sliding.

6. A seat back-rest and liner assembly, for mounting on a pivotable pick-up truck tailgate which selectively fixes to the pick-up cargo box and tailgate comprising of: a larger rectangular moldable panel, a smaller base panel; wherein said base panel is able to be attached to said tailgate; Hinges which provide a means to connect and pivot said larger panel to said base panel; a sliding striker mechanism which is able to provide a means to selectively attach the larger panel to said cargo box structure thereby creating a seat back-rest; a support of at least one of cable and strap which is able to connect said larger panel to said tailgate; snap fit connectors which are able to provide a means to selectively fix said larger panel to said tailgate in the closed position when used mainly as a tailgate liner.

7. The seat back assembly of claim 6 wherein hinges are integrally molded with said panels.

8. The seat back assembly of claim 6 wherein a sliding striker mechanism is housed within said larger panel to provide a means to lock into existing vehicle body side tailgate latch brackets.

* * * * *